(12) United States Patent
Yen et al.

(10) Patent No.: US 11,749,268 B2
(45) Date of Patent: Sep. 5, 2023

(54) SOUND IDENTIFICATION SYSTEM FOR PRIVACY

(71) Applicant: devicebrook Inc.

(72) Inventors: Wei Yen, Bellevue, WA (US);
Raymond Lo, Bellevue, WA (US);
Sourabh Ladha, Bellevue, WA (US);
Wilson Ho, Bellevue, WA (US); John Masin, Bellevue, WA (US)

(73) Assignee: devicebook Inc., Bellevue, WA (US)

( * ) Notice: Subject to any disclaimer, the term of this patent is extended or adjusted under 35 U.S.C. 154(b) by 0 days.

(21) Appl. No.: 16/986,960

(22) Filed: Aug. 6, 2020

(65) Prior Publication Data

US 2021/0050012 A1 Feb. 18, 2021

Related U.S. Application Data

(60) Provisional application No. 62/885,678, filed on Aug. 12, 2019.

(51) Int. Cl.
*G10L 17/22* (2013.01)
*G10L 15/22* (2006.01)
*G10L 15/08* (2006.01)

(52) U.S. Cl.
CPC ............ *G10L 15/22* (2013.01); *G10L 15/083* (2013.01)

(58) Field of Classification Search
CPC ......... G10L 17/22; G10L 17/00; G10L 17/06;
G10L 17/26; G10L 15/07; G10L 15/00;
G10L 15/01; G10L 15/06; G10L 15/065;
G10L 15/20; G10L 15/22; G10L 15/26
USPC .... 704/246, 250, 255, 231, 251, 275, 270.1, 704/270, 273
See application file for complete search history.

(56) References Cited

U.S. PATENT DOCUMENTS

| | | | |
|---|---|---|---|
| 2016/0203429 A1* | 7/2016 | Mellott | G06Q 10/06 705/7.25 |
| 2018/0047394 A1* | 2/2018 | Tian | G01S 5/00 |
| 2019/0371304 A1* | 12/2019 | Fritz | G10L 15/22 |

* cited by examiner

*Primary Examiner* — Qi Han
(74) *Attorney, Agent, or Firm* — Nixon & Vanderhye P.C.

(57) ABSTRACT

A "SOUND ID SYSTEM" comprise a Device with a microphone that continuously monitors the surrounding environment. Pre-recorded personalized or unique sound patterns, signatures, and/or key words, and/or their derivatives, are stored in the Device. When such a pre-determined pre-recorded sound pattern, signature, or key words, or their derivatives, are recognized by the Device, a corresponding pre-determined action or action sequence will be sent to the Cloud, or other devices, to execute. Such other devices can attach, co-habitat, and wired/wirelessly connect to the Device, or share some components with the Device. If the Device does not recognize any particular pre-recorded sound pattern, signature or key words, or their derivatives, then the Device will not transmit to disclose to any outside device or other entity, any monitored sound information.

5 Claims, 1 Drawing Sheet

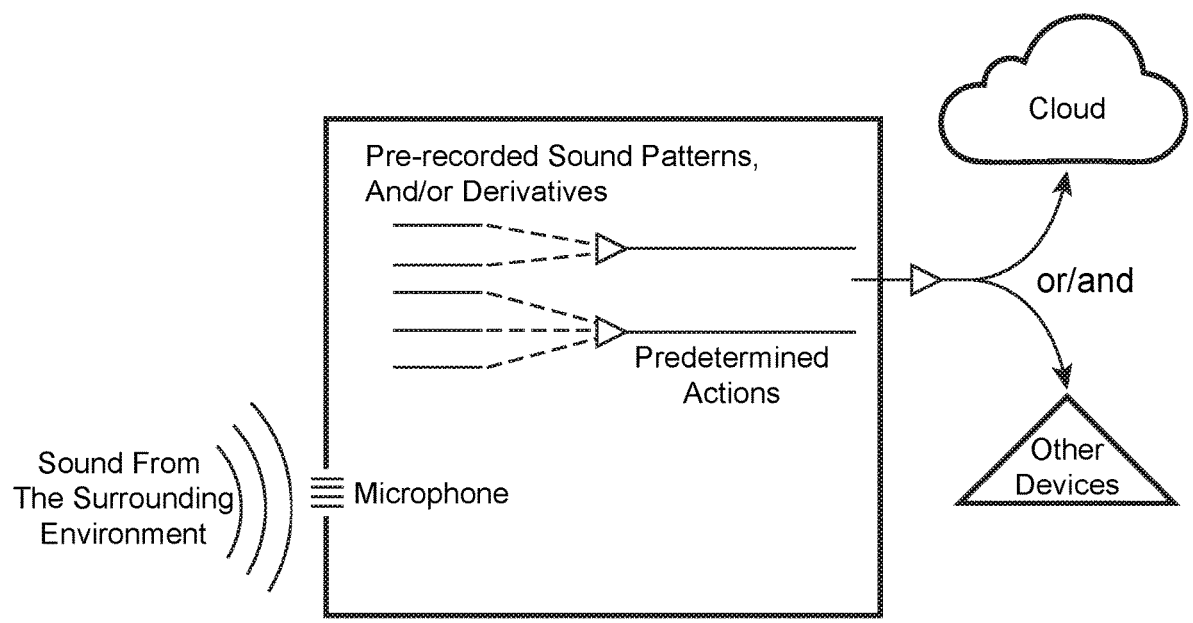

SOUND IDENTIFICATION SYSTEM FOR PRIVACY

CROSS-REFERENCE TO RELATED APPLICATIONS

This application claims benefit of U.S. Provisional Application No. 62/885,678, filed Aug. 12, 2019.

STATEMENT REGARDING FEDERALLY SPONSORED RESEARCH OR DEVELOPMENT

None.

BACKGROUND & SUMMARY

A device that listens to sound and voice such as Amazon Alexa or Google Assistant sends your sounds and voice to the Cloud, where your sounds and voice are most likely recorded, processed, or/and stored. It's a very uncomfortable situation that your private conversations and sounds are learned or monitored by unknown people outside of your control and possession.

BRIEF DESCRIPTION OF THE DRAWINGS

FIG. 1 is a block diagram of an example SOUND ID SYSTEM.

DETAILED DESCRIPTION OF EXAMPLE NON-LIMITING EMBODIMENTS

The present non-limiting technology provides a "SOUND ID SYSTEM": A Device with a microphone that continuously monitors the surrounding environment. Pre-recorded personalized or unique sound patterns, signatures and/or key words, and/or their derivatives, are stored in the Device. When a particular pre-determined pre-recorded sound pattern, signature, or key words, or their derivatives, are recognized by the Device, a corresponding pre-determined action or action sequence will be sent to the Cloud, or other devices, to execute. Such other devices can attach, co-habitat, and wired/wirelessly connect to the Device, or share some components with the Device. If the Device does not recognize any such particular pre-recorded sound pattern, signature or key words, or their derivatives, then the Device will not transmit to disclose to any outside device or other entity, any monitored sound information.

In one example embodiment, the Device includes a microphone, a processor and some memory. The processor executes certain software to recognized predetermined particular sound signatures, and/or patterns, and/or their derivatives. A corresponding pre-determined action will be triggered by the particular sound signature, and/or pattern, and/or their derivatives, to be sent to the Cloud and/or to other devices to execute.

This SOUND ID SYSTEM can be used in, but not limited to, Home Security, Smart Buildings, Elderly Care, Baby/Child Monitoring, or any Alert/Alarm systems Non-Limiting Features Include:

The sound and conversations in the environment being monitored by the device will not be processed or stored outside of the device. Privacy is kept.

Except for the pre-recorded sound pattern, signature, or speaker(s)-dependent key words, or their derivatives, no other sound or conversations or their derivatives in the environment being monitored by the device will be stored in the device. Supreme Privacy is kept.

The only information that will be sent outside of the device to the Cloud, or other devices, to execute is the specific corresponding pre-determined actions triggered by the recognized sound pattern, signature, or speaker(s)-dependent key words, or their derivatives. Privacy is kept.

In the SOUND ID SYSTEM, if specific speaker(s)-dependent KEY WORDS, and/or their derivatives, are pre-recorded in secrecy, this further enhances the level of security. The secrecy of the KEY WORDS makes it even harder for any others to trigger the predetermined actions.

Pre-recorded sound pattern, signature, or speaker(s)-dependent key words, or their derivatives, can be made to belong only to the User(s) being monitored and no one else. For example, they can be selected or structured so they are unique or specific to the User(s) and to decrease the likelihood that someone else will accidentally use or discover them. Supreme Privacy is kept.

If a User has an Account which owns, or is allowed to use a Group of Devices, the User's setup of the particular pre-recorded sound patterns, signatures, or/and speaker-dependent key-words, or/and their derivatives, and the corresponding pre-determined action list made for one Device can be shared by all Devices in the Group. In turn, the User could trigger the pre-determined actions being executed in the Cloud or other devices if, and only if, one of the particular pre-recorded sound patterns, signatures, or speaker-dependent key-words, or their derivatives, being recognized and matched in any one of the Device in the Group.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A sound ID device comprising:
a microphone that continually monitors sound and conversations in an environment; and
a processor operatively coupled to the microphone, the processor executing certain software to (a) recognize pre-recorded sound signatures and/or patterns and/or key words and/or derivatives thereof in the continually monitored sound and conversations, and (b) sending a corresponding pre-determined trigger action in response to recognizing a particular pre-recorded sound signature, and/or pattern, and/or key word and/or derivative thereof to trigger a cloud device and/or to other device(s) external to the sound ID device to execute;
wherein the sound ID device is configured so the sound and conversations monitored by the sound ID device microphone are not sent, processed or stored outside of the sound ID device,
the sound ID device is further configured to not transmit to any outside device or other entity, any monitored sound information when the processor does not recognize any such sound signatures, patterns, and/or key words, and/or their derivatives, and
the sound ID device is further configured to not store any monitored sound or conversation or their derivatives in the device except for the pre-recorded sound signatures and/or patterns and/or key words, and/or their derivatives.

2. A sound ID method comprising:
with a microphone, continually monitoring sound in an environment;
with a processor connected to the microphone, recognizing predetermined sound signatures and/or patterns and/or key words and/or derivatives thereof, and sending a corresponding pre-determined trigger action external to the sound ID device by recognizing a particular sound signature, and/or pattern, and/or key word and/or derivative thereof, to trigger a cloud device and/or to other device(s) external to the sound ID device to execute;
not sending any information outside of the device to the Cloud, or other device(s), except the trigger to execute the pre-determined action triggered by the recognized sound signature, pattern, or key words, or their derivatives,
not transmitting to disclose to any outside device or other entity, any monitored sound information if the sound ID device does not recognize any such particular pre-recorded sound signature, pattern, or key words, or their derivatives, and
not storing any other sound or conversations or their derivatives monitored from the environment except for the pre-recorded sound signatures, patterns, key words, or their derivatives.

3. A sound ID method of claim 2 further including prerecording specific speaker(s)-dependent key words or their derivatives in secrecy to further enhance a level of security.

4. The sound identification method of claim 3 further including assigning the pre-recorded sound patterns, signatures, or/and speaker(s)-dependent key words, or/and their derivatives, to belong only to a User(s) being monitored and no one else.

5. A sound ID method comprising:
with a microphone, continually monitoring sound in an environment; and
with a processor operatively coupled to the microphone, recognizing in the continually monitored sound, particular pre-recorded sound signatures, and/or patterns and/or speaker(s)-dependent key words, or their derivatives, and sending a pre-determined trigger action in response to recognizing a particular sound signature, and/or pattern, and/or speaker(s)-dependent key-words and/or derivative thereof in the continually monitored sound to trigger a cloud device and/or to other device(s) external to the sound ID device to execute the pre-determined action;
when a User has an Account which owns, or is allowed to use a Group of Devices, sharing by all Devices in the Group of Devices (a)_a User setup of the particular pre-recorded sound signatures, or/and patterns and/or speaker-dependent key-words, or/and their derivatives, and (b) a corresponding pre-determined action list made for one Device, thereby enabling a User to trigger the pre-determined action executed in the Cloud device or other device(s) external to the sound ID device if, and only if, one of the particular pre-recorded sound signature, and/or patterns, and/or speaker(s)-dependent key-words, and/or their derivatives, is recognized and matched in any one of the Devices in the Group of Devices; and otherwise not sending any information outside of the device to the Cloud device, or other device(s) external of the Group of Devices, except the triggers to execute specific pre-determined actions,
when the sound ID device does not recognize any such particular pre-recorded sound signature, and/or pattern and/or speaker(s)-dependent key words, or their derivatives, not transmitting to disclose to any outside device or other entity, any monitored sound information, and
not storing any other sound or conversations or their derivatives in the environment being monitored by the device except for the pre-recorded sound signatures, and/or patterns and/or speaker(s)-dependent key words and/or their derivatives.

* * * * *